No. 11,709. Reissued Jan. 10, 1899.
F. G. KOEHLER.
CAR TRUCK.
(Application filed Nov. 9, 1898.)
2 Sheets—Sheet 1.
Fig. I.
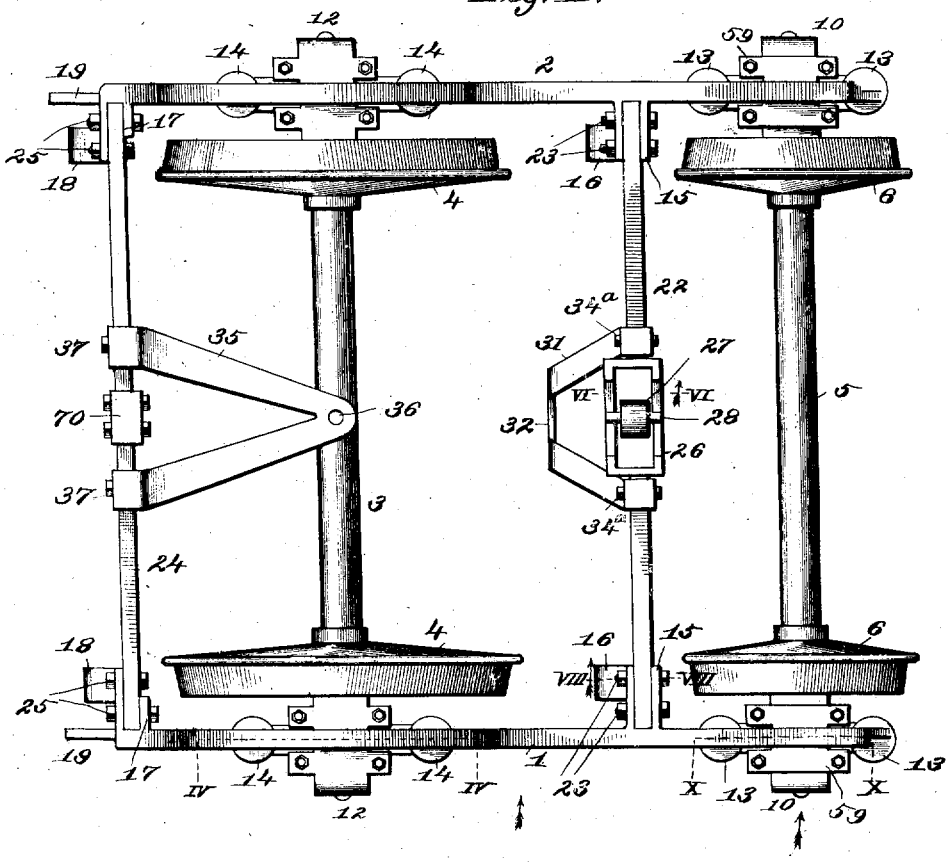
Fig. II.
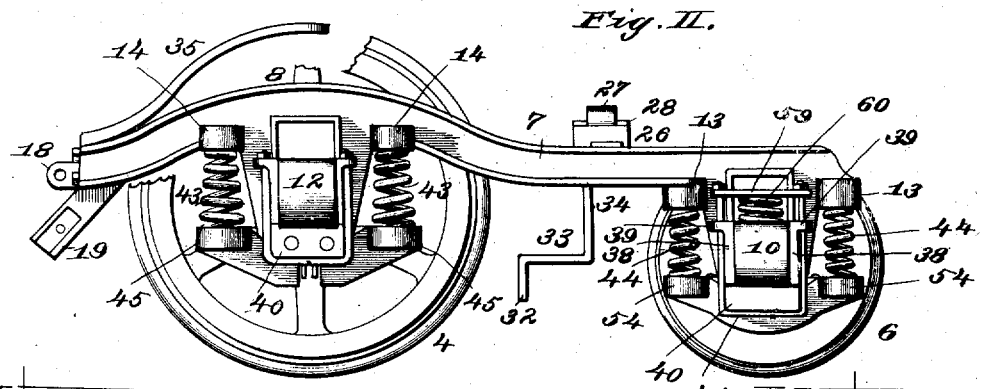
Witnesses—
G. A. Rauberschmitt,
E. S. Knight
Inventor—
Frank G. Koehler.
By Knight Bros
Attorneys.

No. 11,709. Reissued Jan. 10, 1899.
F. G. KOEHLER.
CAR TRUCK.
(Application filed Nov. 9, 1898.)
2 Sheets—Sheet 2.
Fig. III.
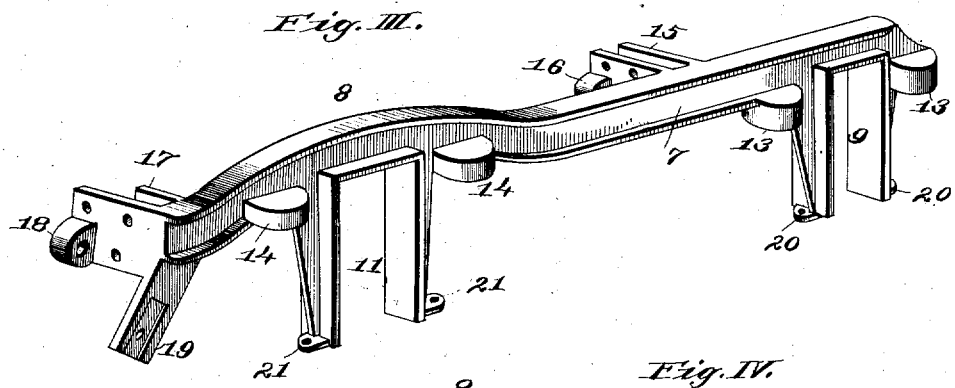
Fig. IV.
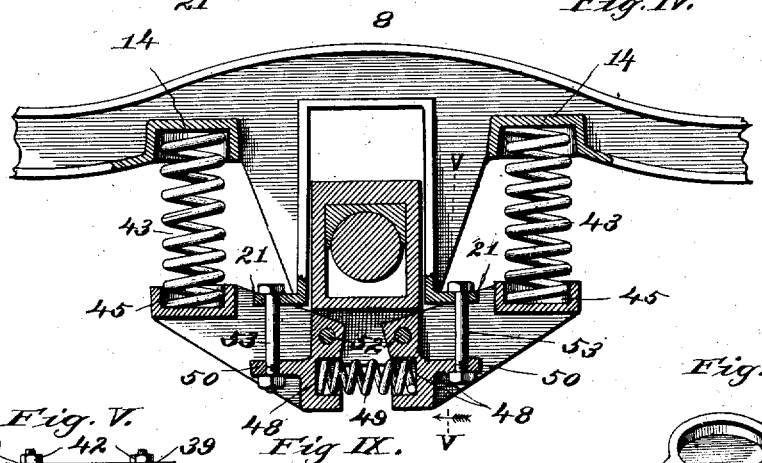
Fig. V.
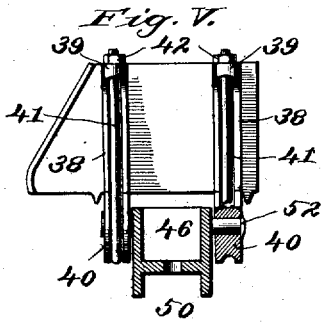
Fig IX.
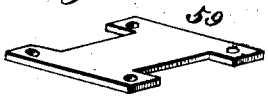
Fig. VII.
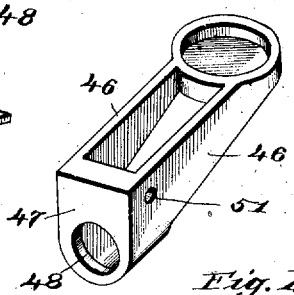
Fig. VIII.
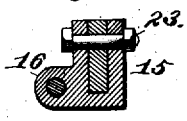
Fig. VI.
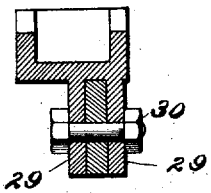
Fig. X.
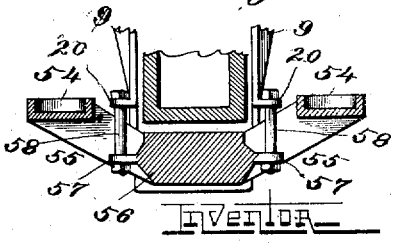
Witnesses
G. A. Rauberschmidt,
E. Knight
Inventor
Frank G. Koehler
By Wright Bros
Attorneys.

UNITED STATES PATENT OFFICE.

FRANK G. KOEHLER, OF ST. LOUIS, MISSOURI, ASSIGNOR TO THE LACLEDE CAR COMPANY, OF SAME PLACE.

CAR-TRUCK.

SPECIFICATION forming part of Reissued Letters Patent No. 11,709, dated January 10, 1899.

Original No. 601,022, dated March 22, 1898. Application for reissue filed November 9, 1898. Serial No. 695,997.

*To all whom it may concern:*

Be it known that I, FRANK G. KOEHLER, a citizen of the United States, residing at the city of St. Louis, in the State of Missouri, have invented a certain new and useful Improvement in Car-Trucks, of which the following is a full, clear, and exact description, reference being had to the accompanying drawings, forming part of this specification.

My invention relates to certain improvements in trucks; and my invention consists in features of novelty hereinafter fully described, and pointed out in the claims.

Figure I is a top or plan view of my improved truck. Fig. II is a side view. Fig. III is a perspective view of one of the side frames of the truck. Fig. IV is an enlarged detail vertical section taken approximately on line IV IV, Fig. I. Fig. V is a detail vertical section taken on line V V, Fig. IV. Fig. VI is an enlarged vertical section taken on line VI VI, Fig. I. Fig. VII is a perspective view of one of the pivoted spring-seats. Fig. VIII is an enlarged vertical transverse section taken on line VIII VIII, Fig. I. Fig. IX is a perspective view of one of the sliding spring-seats of the pony-wheels. Fig. X is an enlarged vertical section taken on line X X, Fig. I.

1 and 2 represent the side frames of the truck. These frames are alike, except that they are made in rights and lefts.

3 represents the axles of the driving-wheels 4, and 5 the axles of the pony-wheels 6.

As usual with pivotal trucks, two are provided for each car, and for convenience I will assume that the truck shown in Fig. I is the front truck of a car.

The construction of the side frames is shown in Fig. III, each frame consisting of an inner horizontal portion 7 and an outer upwardly-curved portion 8, thus providing for the boxes of the driving-wheels being located higher from the rails than the boxes of the pony-wheels. The inner end of each side frame is provided with a pedestal 9 to receive the axle-boxes 10 of the pony-wheels, and the outer part of each frame is provided with a pedestal 11 to receive the axle-boxes 12 of the driving-wheels. The inner end of each side frame is provided with downwardly-extending spring-seats 13, one on each side of the pedestal 9, and the outer part of each side frame is provided with downwardly-extending spring-seats 14, one on each side of the pedestal 11. Extending inwardly from the central portion of the part 7 of each side frame is a channel-shaped arm 15, and on the inner face of each arm 15 there is a perforated ear 16, the ear 16 serving as means of attachment for the brake-hangers. (Not shown.) Extending inwardly from the extreme forward end of each side frame is a channel-shaped arm 17, the arms 17 having perforated ears 18 to receive the front brake-hangers.

19 represents perforated lugs extending forwardly and downwardly at an angle of about forty-five degrees from the forward end of each side frame, these lugs 19 serving as a means for attachment of the fender. (Not shown.)

On the lower ends of the pedestals 9 are perforated ears or lugs 20, and on the lower ends of the pedestals 11 are perforated ears or lugs 21.

All of the parts of each side frame above mentioned are cast integral, thus forming a single casting containing all of the parts for each side frame.

The inner ends of the side frames are connected by a cross-bar 22, fitting in the arms 15, as shown in Fig. I, and held to the arms by means of bolts 23, and in like manner the outer ends of the side frames are connected by means of a cross-bar 24, fitting in the arms 17 and held thereto by means of bolts 25. The side frames are thus connected in a simple, strong, and durable manner and in a manner which permits of their being readily disconnected, while at the same time the cross-bars are not elevated above the upper surface of the side frames, thus producing a truck-frame having a neat appearance and a truck-frame that has no obstructions, so far as the connection between the two side members are concerned, above the upper edges of the side members.

The center bearing of the truck is secured to the cross-bar 22 and consists of a rectangular box 26, mounted in a horizontal position and extending longitudinally of the cross-bar. The box is open at the top to form a free passage for a roller 27, the upper edges of the sides of the box being cut away to form tracks or bearings for the spindle 28 of the roller 27, the travel of said spindle being limited by the length of the cut-away portions of the sides of the box. As shown in Fig. VI, the box 26 has depending flanges 29, embracing the cross-bar 22 and connected thereto by means of bolts 30, whereby the box is firmly held to the cross-bar.

31 represents a motor-supporting frame secured to the cross-bar 22 and consisting of a central portion 32, which occupies a vertical position extending in a plane parallel with that of the cross-bar 22 and horizontal portions 33, that extend from the ends of the portion 32 back to a position below the cross-bar, and from these portions 33 extend vertical portions 34, the upper ends of which are bent into the form of hooks that engage the cross-bar 22, to which they are secured by bolts 34ª.

35 represents the bolster, which is V-shaped and which is secured to the cross-bar 24. The bolster extends inwardly and has a hole 36 to receive the king-bolt, which is located directly above the center of the axle 3. The ends of the bolster are forked to receive the bar 24, to which they are secured by bolts 37. The journal-boxes 10 and 12 have grooved ribs 38 on either side of the pedestals, terminating at their upper ends in perforated ears 39.

40 represents blocks placed beneath the journal-boxes, (see Figs. II and V,) these blocks having grooves registering, respectively, with the grooves in the ribs 38.

41 represents U-shaped straps fitting in the grooves in the blocks 40 and ribs 38 and the upper ends of which extend through the perforated ears 39, above which the straps are provided with nuts 42, whereby the blocks 40 are held to the journal-boxes.

43 represents the truck-springs of the forward end of the truck, and 44 the truck-springs of the rear or inner end of the truck. The upper ends of the springs 43 rest in the seats 14, and their lower ends rest in seats 45. (Shown most clearly in Figs. IV, V, and VII.) The seats 45 are respectively located on the outer ends of parallel arms 46, (see Fig. VII,) the inner ends of the arms being respectively connected by a vertical wall 47. The walls 47 are provided with seats 48 to receive a spring 49. Each pair of arms 46 is provided with a horizontal flange 50, immediately inside of the wall 47, and each pair of arms has a horizontal perforation 51, located above the spring-seats 48. The inner ends of the arms fit between the blocks 40, to which they are connected by means of pins 52, the arms being thus pivotally connected or supported. Bolts 53 are passed loosely through the perforations in the flanges 50 and also through the perforations in the ears 21. It will thus be observed that the spring-seats 45 will have a yielding action when the truck is in use, the movement of the arms on their pivots 52 being yieldingly resisted by the spring 49, and in the event of breakage of the spring the arms will be held by the bolts 53 from moving sufficiently far to cause the displacement of the truck-springs 43.

The upper ends of the truck-springs 44 rest in the perforated ears 13, and their lower ends rest in seats 54 on the outer ends of arms 55, extending from a block 56, that fits between the blocks 40 of the inner end of the truck. The block 56 is provided with perforated ears 57, connected to the ears 20 by means of bolts 58. (See Fig. X.) The U-shaped straps 41 of these inner journal-boxes extend up beyond the ears 39 and through perforations in a plate 59, resting upon an axle-box spring 60. The plate 59 (see Fig. IX) is notched to receive the pedestal, and it is thus free to move up and down under the action of the spring 60.

70 represents a block attached to and extending upwardly from the center of the cross-bar 24.

The car-body is designed to rest upon the roller 27 and upon the block 70, a king-bolt passing through the perforation 36 in the bolster 35. When the weight of the car-body compresses the springs 43, the bolts 53 will work loosely in the perforated ears that receive them, and when the springs 43 expand the bolts act to limit the upward movement of the truck-frame.

The motor is mounted upon the frame 31, this frame being connected to the sides of the truck-frame by means of the cross-bar 22, thus throwing the weight of the motor upon the truck-springs.

I claim as my invention—

1. In a car-truck, the combination of side frames provided with pedestals to receive the journal-boxes, a cross-bar connecting said side frames and located between the front and rear wheels of the truck, a cross-bar connecting said side frames and located in front of the front wheels of the truck, spring-seats projecting downwardly from said side frames upon opposite sides of the pedestals, and fender-arms projecting forwardly and downwardly from the forward ends of said side frames; said pedestals and said spring-seats being in alinement with the side frames, substantially as set forth.

2. In a car-truck, the combination of side frames having pedestals receiving the journal-boxes, channel-bar-shaped arms projecting inwardly from the side frames at points between the front and rear wheels of the truck, a cross-bar having its ends mounted in the channels of said arms and secured in position, brake-hanger ears projecting from said arms and a motor-supporting frame attached to said cross-bar, substantially as set forth.

3. In a car-truck, the combination of side frames having pedestals receiving the journal-boxes, upper spring-seats projecting downwardly from said side frames on opposite sides of the pedestals, blocks mounted in vertical parallel positions and securely attached to said journal-boxes, arms pivotally mounted between said blocks and yieldingly connected to said pedestals, and an expansive coil-spring mounted in a horizontal position between said pivotal arms, and coil-springs mounted between said spring-seats and said pivoted arms, substantially as set forth.

4. In a car-truck, the combination of side frames having pedestals receiving the journal-boxes, arms mounted below said journal-boxes, and yieldingly connected to said pedestals and the said journal-boxes, a coil-spring inserted in position to normally hold said arms against said journal-boxes, lower spring-seats formed in the outer ends of said arms, upper spring-seats projecting downwardly from said side frames on opposite sides of the pedestals, and coil-springs inserted between said lower and upper spring-seats, substantially as specified.

5. In a car-truck, the combination of side frames having pedestals receiving the journal-boxes, a cross-bar connecting said side frames and located between the front and rear wheels of the truck, a cross-bar connecting said side frames and located in front of the front wheels of the truck, upper spring-seats projecting downwardly from said side frames upon opposite sides of said pedestals, fender-arms projecting forwardly and downwardly from the forward ends of said side frames, arms supporting the first-mentioned cross-bar, brake-hanger ears projecting from the last-mentioned arms, and a motor-supporting frame attached to said first-mentioned cross-bar; said pedestals and said spirng-seats being in alinement with said side frames, substantially as set forth.

6. In a car-truck, the combination of side frames having pedestals receiving the journal-boxes, channel-bar-shaped arms projecting inwardly from said side frames at points between the front and rear wheels of the truck, a cross-bar having its ends mounted in the channels of said arms and secured in position, brake-hanger ears projecting from said arms, a motor-supporting frame attached to said cross-bar, a box attached to said cross-bar, and a roller operating in said box; the axis of said roller being in a line transverse of the axis of the wheels to form a center bearing for the car-body, substantially as set forth.

7. In a car-truck, the combination of side frames having pedestals receiving the journal-boxes, a cross-bar connecting said side frames and located between the front and rear wheels of the truck, a cross-bar connecting said side frames and located in front of the front wheels of the truck, upper spring-seats projecting downwardly from said side frames upon opposite sides of said pedestals, a bolster attached to the front cross-bar and extending upwardly and backwardly to a point substantially in vertical alinement with the front axle, and fender-arms projecting forwardly and downwardly from the forward ends of said side frames, said pedestals and said spring-seats being in alinement with said side frames, substantially as set forth.

8. In a car-truck, the combination of side frames provided with axle-box pedestals and having arms on their inner faces, and transverse bars located between the side frames and connected at their ends to said arms; said transverse bars being each provided with a bearing to receive the car-body, substantially as set forth.

9. In a car-truck, the combination of side frames provided with axle-box pedestals and having arms on their inner faces, and transverse bars located between the side frames and removably connected at their ends to said arms; said transverse bars being each provided with a bearing to receive the car-body, substantially as set forth.

10. In a car-truck, the combination of side frames having pedestals to receive the journal-boxes, blocks secured to the journal-boxes, arms 53 pivoted to said blocks at their inner ends and having spring-seats at their outer ends, a spring 49 placed between the inner ends of said arms, and springs 43 placed between the outer ends of said arms and the side frames, substantially as set forth.

11. In a car-truck, the combination of side frames having pedestals receiving the journal-boxes, blocks connected to said journal-boxes, arms 53 pivoted to said blocks at their inner ends and having spring-seats at their outer ends, a spring located between the inner ends of said arms, and springs located between the outer ends of said arms and the side frames; said arms being provided with flanges to receive bolts by which the arms are connected to the lower ends of said pedestals, substantially as set forth.

12. A truck having side frames, each consisting of a member having pedestals, spring-seats on each side of the pedestals, inwardly-projecting arms, perforated lugs on the lower ends of said pedestals and perforated ears on said arms, all cast integral, substantially as set forth.

FRANK G. KOEHLER.

In presence of—
E. S. KNIGHT,
STANLEY STOVER.